Figure 1:
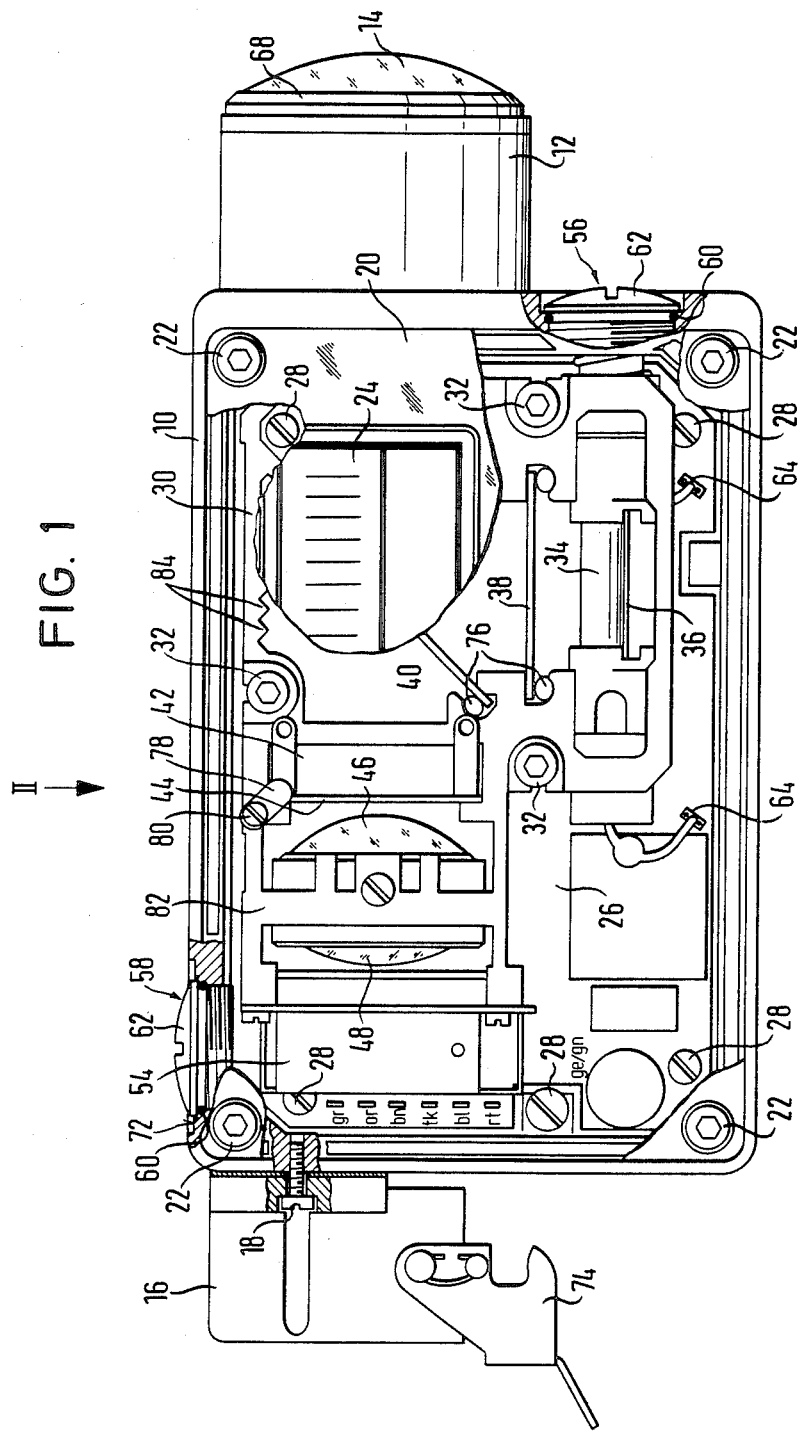

United States Patent [19]

Anselment et al.

[11] Patent Number: 4,722,607
[45] Date of Patent: Feb. 2, 1988

[54] LUMINESCENCE SENSOR

[75] Inventors: Christoph Anselment, Freiburg; Jürgen Krank, Waldkirch, both of Fed. Rep. of Germany

[73] Assignee: Erwin Sick GmbH OPtik Elektronik, Wladkirch, Fed. Rep. of Germany

[21] Appl. No.: 839,765

[22] Filed: Mar. 13, 1986

[30] Foreign Application Priority Data

Apr. 15, 1985 [DE] Fed. Rep. of Germany ....... 3513475

[51] Int. Cl.⁴ .............................................. G01N 21/64
[52] U.S. Cl. .................................. 356/417; 250/221; 250/239; 250/461.1
[58] Field of Search ...................... 356/317, 318, 417; 250/221, 239, 458.1, 459.1, 461.1, 461.2

[56] References Cited

U.S. PATENT DOCUMENTS

| | | | |
|---|---|---|---|
| 3,578,978 | 5/1971 | Laurent | 250/239 X |
| 3,740,562 | 6/1973 | Fertig | 250/239 X |
| 3,842,258 | 10/1974 | Shaw | 250/239 X |
| 4,021,665 | 5/1977 | Haas et al. | 250/239 |
| 4,055,761 | 10/1977 | Shimomura | 250/239 |
| 4,200,801 | 4/1980 | Schuresko | 250/458.1 |
| 4,282,430 | 8/1981 | Hatten et al. | 250/239 X |
| 4,638,154 | 1/1987 | Itsuki et al. | 250/239 X |

Primary Examiner—Vincent P. McGraw
Attorney, Agent, or Firm—Townsend & Townsend

[57] ABSTRACT

The luminescence sensor has a housing insert (30) which is formed as an extruded section which carries the optical and optoelectronic components in a preadjusted arrangement. The housing insert can be built into the housing (10) on which a peripheral part of the optical system is mounted in an adjusted manner. A fluorescent tube (34) with a precision mount is located in a receiving mount of the housing insert (30) and is accessible in order to exchange it through a housing opening (56).

14 Claims, 7 Drawing Figures

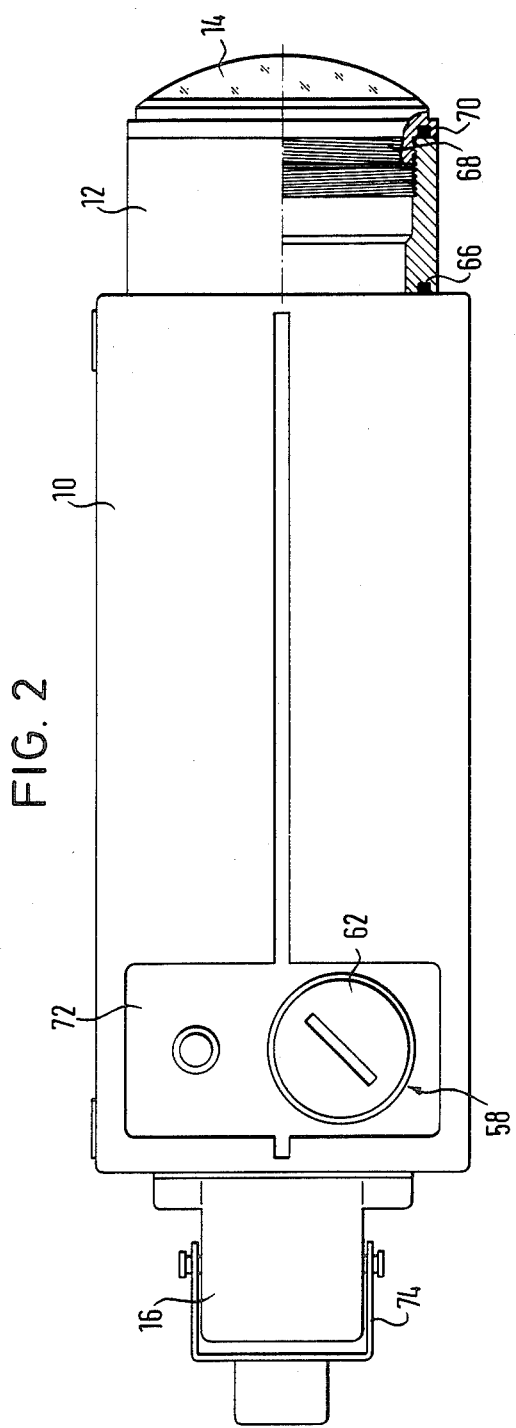

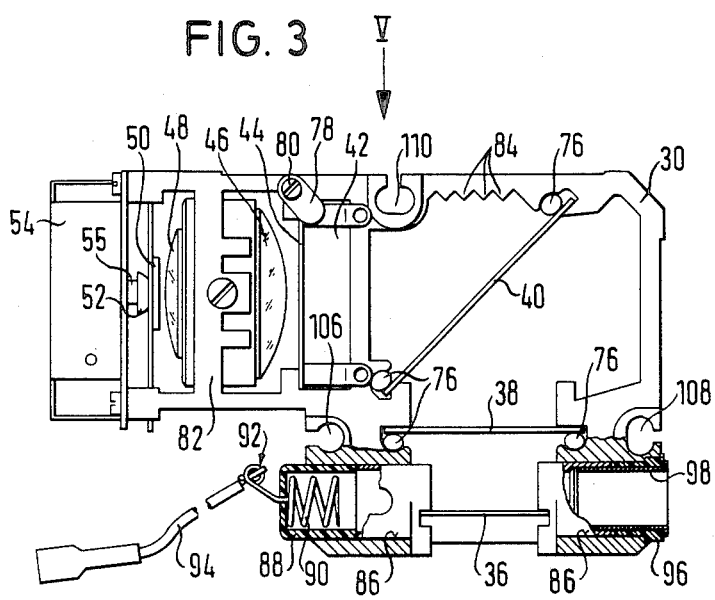
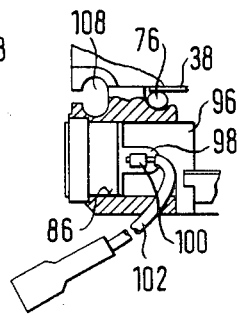
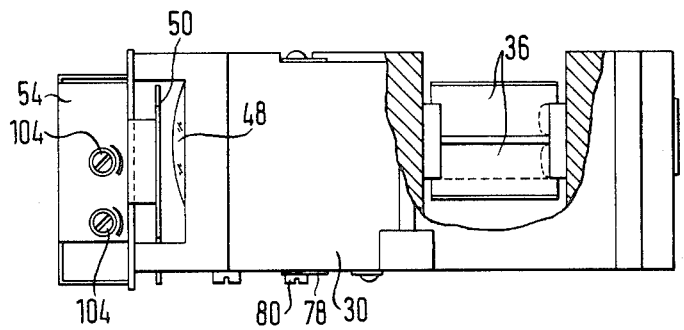

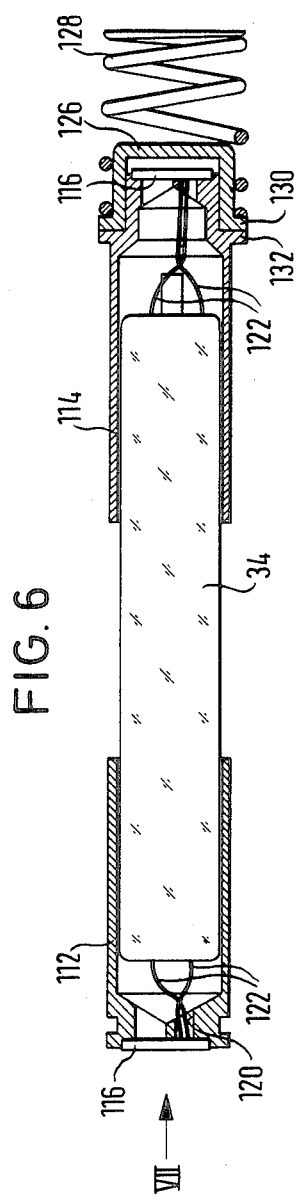
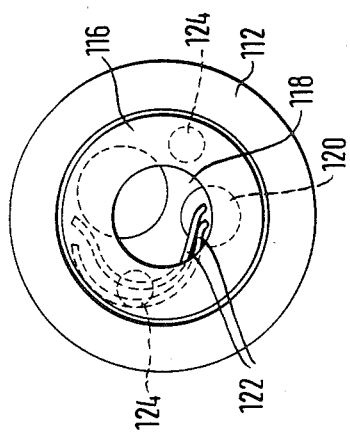

LUMINESCENCE SENSOR

The invention relates to a luminescence sensor or light sensor comprising a housing which has an opening for the entry and exit of light; a light transmitter, a light guiding optical system, a light receiver and an electronic processing circuit which is arranged after the light receiver, with a peripheral part of the optical system being mounted in a predetermined position on the housing itself, and with the remaining elements being combined together into constructional groups in an at least partially adjusted arrangement.

Such luminescence sensors are for example used to recognise labels under difficult contrast conditions. They transmit an ultraviolet light beam which is converted outside of the housing into visible light by a fluorescent marking on the label. This visible light is detected by the light receiver and then further processed in an electronic circuit which delivers an appropriate control signal.

With known luminescence sensors the optical system has to be adjusted in the final phase of assembly by displacing the optical components which have been mounted in the housing relative to one another. Because, in the interest of a compact construction, the components are accommodated in the smallest possible space, access to them is made more difficult and the adjustment is correspondingly tedious. The adjustment work must be effected by schooled specialist personnel and is correspondingly wage-intensive. It is not possible to ensure with certainty that an ideal adjustment once found does not become lost over the period of operation of the device. This danger exists in particular when exchanging the light transmitter which has a shorter life than the remaining parts of the optical system. In known luminescence sensors the exchanging of the light transmitter regularly leads to the adjustment being lost and the sensors have to be readjusted which is expensive and involved and again requires the use of schooled specialist personnel.

Furthermore, a fluorescence sensor is already known (GB-PS 422 190) which serves to read out information concerning dried fruit and which has a housing containing an opening for the entry and emergence of light and also a light transmitter, a light guiding optical system and a light receiver. The optical components are subdivided in this arrangement into three groups of components. A front lens, a reflecting mirror and a planoconvex lens which focusses the reflected light onto the light receiver are directly connected with the housing. A second constructional group independent therefrom contains, in an adjusted arrangement, the light transmitter in the form of a mercury vapor lamp and a parabolic mirror which surrounds the mercury vapor lamp and is likewise adjustable. A third component group is formed by the light receiver with the associated aperture diaphragm. Moreover, the housing of the known luminescence sensor contains, at a position which is not defined in more detail, an electronic processing circuit which is connected to the light receiver and also an electronic supply part for the light transmitter.

The object underlying the invention is to provide a luminescence sensor which is of uncomplicated construction, which is technically simple to manufacture and to assemble and the adjustment of which is considerably simplified, and remains permanently troublefree, in particular when inserting a substitute light transmitter.

In order to satisfy this object the invention provides that a single housing insert which is constructed as a carrier for the light transmitter, for the light receiver, and for a part of the optical system which is disposed adjacent thereto in a form adjusted relative to one another, and that the carrier is received in the housing and is rigidly connectable thereto so that it is adjusted relative to the peripheral part of the optical system.

Thus, in accordance with the invention, only a single housing insert is provided which serves as a combined carrier for the light transmitter, the light receiver and a part of the optical system lying adjacent thereto. These optical components are mounted so that they are adjusted relative to one another with the result that the insert represents an optically completely preadjusted unit. The peripheral part of the optical system is in turn fixed in position at the housing so that to this extent a fixed adjustment is given as a result of the initial assembly. The assembly of the prefinished units, i.e. of the housing with the peripheral optical system on the one hand and of the insert with the light transmitter, light receiver and associated optical system on the other hand, is now particularly simple and can be effected without involved adjustment work. Any remaining positioning work which is necessary can be carried out by untrained personnel. After the insert has been exactly positioned in the housing all the optical components are aligned with one another in problemfree manner.

In accordance with a preferred embodiment the housing insert is constructed as an extruded section and is preferably provided with grooves or notches which serve for positioning. The extrusion technique makes it possible to produce guide surfaces with high accuracy for the optical components at favourable cost without extensive chip forming machining being necessary. Positioning aids can also easily be molded on the extrusion.

Furthermore, it is expedient to provide the housing insert with locations at which bores are desired and to first drill the bores when the insert is in the adjusted position. In this way the ideal adjusted position can, once found, be fixed with very fine tolerances and there is no possibility of it becoming mal-adjusted during the operating life of the unit.

The housing insert can be formed as a combined optical/electronic insert and can in particular carry the part of the electronic circuit which is arranged directly after the light receiver. Apart from the fact that this opens up favourable possibilities for equipping the apparatus with electronic components the possibility also exists of testing the adjustment of the optical components on the insert using the light receiver and the associated electronic circuitry itself.

In an expedient further development of the invention provision is made to releasably mount the light transmitter in an accurately fitted mount of the housing insert in which the light transmitter is disposed in an adjusted position relative to the part of the optical system carried by the insert. The accurately fitted mount makes it possible to change the light transmitter so that the substitute part is also accurately disposed in an adjusted position. In this way no subsequent adjustment of the optical system is necessary after exchanging the light transmitter.

An opening is expediently provided in the housing through which the light transmitter is accessible. In this way the light transmitter can be exchanged without having to release the assembly of the housing insert and the housing so that the optical system as a whole remains adjusted.

It is of advantage to seal the housing relative to the atmosphere in order to ensure freedom from dust and stable optical operating conditions in its interior. The opening provided for the exchange of the light transmitter should then be capable of being closed in sealed manner for which purpose a screw plug having a high strength thread can be used which is constructionally simple and results in a robust design.

A fluorescent tube is preferably used as the light transmitter which has the advantage of low production cost, a small energy consumption and a long operating life. Fluorescent tubes are moreover available in various spectral ranges. A precision mount in which the fluorescent tube is mechanically held and electrically contacted is provided so that the fluorescent tube can be built in with the desired accuracy. The precision mount fits in the receiving mount of the housing insert.

The invention will now be described in more detail in the following by way of example only and with reference to the embodiment illustrated in the drawings which show:

FIG. 1 a sideview of the broken away housing of a complete luminescence sensor in accordance with the invention;

FIG. 2 a plan view of the housing in the direction of the arrow II of FIG. 1;

FIG. 3 the sideview of a housing insert for the luminescence sensor which has been partly sectioned in a longitudinal plane of the light transmitter;

FIG. 4 the rear view of a detail of FIG. 3 lying at the bottom right;

FIG. 5 a plan view of the housing insert looking in the direction V of FIG. 3, with the apparatus having been partly cut away so that a mirror arrangement disposed beneath the light transmitter is visible;

FIG. 6 a light transmitter with the associated precision mount in longitudinal section;

FIG. 7 a view on the end face of the light transmitter in the direction VII of FIG. 6 to an enlarged scale.

Referring to FIG. 1 the luminescence sensor has a housing 10 which is sealed relative to the atmosphere. The housing 10 has the form of an elongate parallelopiped. A tube 12 which surrounds an opening in the housing serving for the entry and emergence of light projects out of the housing 10 at a front narrow end thereof. The tube 12 adjoins the housing 10 essentially at the upper part thereof. At its free end remote from the housing the tube 12 carries a front lens 14. At the oppositely disposed narrow end of the luminescence sensor an electrical connection with plug-in contacts is located in the upper region of the housing 10 and a multi-pole plug 16 can be set in place at the electrical connection. The plug 16 is fixedly screwed to the housing 10 by means of plug screws 18.

The side of the housing seen in plan view in FIG. 1 is open and can be closed with a housing cover 20 which is secured by screws 22 to all four corners of the housing. The cover 20 bears a description 24 which identifies the manufacturer. The cover 20 is mainly broken away in FIG. 1 so that the components which are built into the housing can be recognised. A circuit board 26 on which a large part of the electrical supply circuit and the processing circuit of the luminescence sensor is mounted is disposed in a rear plane of the housing remote from the housing cover 20. The circuit board 26 is fixedly screwed to the housing 10 by screws 28. Above the circuit board 26 there is disposed a housing insert 30 which serves as a combined carrier for optical and electronic parts and will be described in detail in the following with reference to FIGS. 3 to 5. The insert 30 takes up practically the whole of the inner space of the housing 10. It is secured by screws 32 to the housing 10 and the possibility exists of aligning it relative to the tube 12 with the front lens 14.

The housing insert 30 accommodates the light transmitter in the form of a fluorescent tube 34. The fluorescent tube 34 is located in the right hand lower part of the housing 10. The longitudinal axis of the fluorescent tube is orientated parallel to that of the tube 12. The beam path of the light emitted from the fluorescent tube 34 thus extends perpendicular to the longitudinal axis of the tube 12. A curved mirror arrangement 36 is located beneath the fluorescent tube 34 and deflects the light which is radiated downwardly upwardly to the tube 12. A prismatic mirror or a parabolic mirror can in particular be used at this point with the fluorescent tube 34 lying in the focus thereof. The housing insert 30 carries an optical filter 38 which lies in the beam path, which can be constructed as a colour filter and which preferably simultaneously fulfils the function of an aperture diaphragm. The light which passes through the filter 38 falls onto a partially transmitting mirror 40 which is inclined at an angle of 45° relative to the optical axis. The mirror 40 is preferably a dichroitic mirror and is carried by the housing insert 30. The surround for the dichroitic mirror can again fulfil the function of an aperture diaphragm. The mirror 40 deflects the light through 90° so that it emerges from the housing 10 through the housing opening, the tube 12 and the front lens 14. The tube 12 can contain an image forming optical system with diverse lenses, aperture diaphragms etc. in order to generate a well collimated sharply bundled beam of light.

When using the luminescence sensor as a light barrier the light beam falls on an external retroreflector spaced from the housing 10, with the retroreflector being so adjusted that the light beam is reflected back on itself. The reflected light then enters again into the housing through the front lens 14. The light beam then reaches the semi-permeable mirror 40, optionally after passing through the optical image forming system, where a part of the light, which is of no further interest, is reflected back to the fluorescent tube 34. A part of the light however passes through the semi-permeable mirror 40 and through an optical image forming system to which there belongs a filter 42 which serves as an ultraviolet barrier, an aperture diaphragm 44, two planoconvex lenses 46, 48 and, as shown by FIG. 3, a filter 50 and a magnifying lens 52. All these optical components are carried by the housing insert 30. The optical system serves to focus the light onto a photosensitive surface of a detector, preferably a photodiode 55. The photodiode 55 and an electrical and/or electronic circuit element which is directly associated therewith, in particular its power supply and/or a preamplifier which lies in the processing circuit are likewise mounted on the housing insert 30.

The housing 10 has two smaller openings 56, 58 through which the individual components are accessible without the insert 30 as a whole having to be released from the housing 10. A first opening 56 serves for the exchange of the fluorescent tube 34. It is located beneath the tube 12 at the narrow end of the housing 10 and is arranged, when the housing insert 30 is installed, at the end face of the fluorescent tube 34 so that the fluorescent tube can be pushed through the opening 56 in the longitudinal axial direction. The second opening 58 lies above the photodiode 54 in the rear upper part of the housing 10. The second opening 58 makes it possible to effect an adjustment of the photodiode 54 or to change the adjustment. Both openings 56, 58 are closed by a threaded cover 62 which is formed as a screw head towards the outside with a sealing ring 60 being arranged therebetween. A closure plug with a high strength thread can in particular be used at this point.

Electrical connections for the fluorescent tube 34 are indicated at 64. They are connected to suitable contacts on the circuit board 26. In order to assemble the luminescence sensor the circuit board 26 is firstly inserted into the housing 10 and is loosely screwed into place with the screws 28. The complete premounted housing insert 30 with all the optical and electronic components located thereon is then built in, aligned relative to the optical tube and screwed into place at 32. Finally, one makes the electrical connections, tightens the screws 28, 32 and closes the housing cover 20.

FIG. 2 shows the sealed mounting of the tube 12 to the housing 10 through the intermediary of a sealing ring 66. A screw mounting 68 is provided for the front lens 14 and can be screwed into an internal thread of the tube 12 and sealed with a second sealing ring 70. One can also recognise the out-of-center arrangement of the opening 58 which is located above the photodiode 55 and is closed with a threaded plug with a high strength thread. The screw cap comes to lie in a recess 72 on the upper side of the housing 10. Finally, a hoop 74 can be seen in FIG. 2 which is pivotally secured to the multi-pole plug and by means of which the multi-pole coupling which is to be plugged-in can be secured.

FIGS. 3 to 5 show the housing insert 30 with the optical and electronic components which are secured thereto, with the mount for the fluorescent tube 34 being empty. The housing insert 30 is an extruded part, in particular of light metal, and preferably of aluminium or an aluminium alloy. The view in FIG. 3 is directed in the longitudinal direction of the extrusion from which individual housing inserts 30 are cut. All position determining surfaces for the components are produced in the extrusion manufacturing stage and accordingly subsequent chip-forming machining is in this respect normally not necessary. Using chip-forming techniques it is essentially only the housing opening which is surrounded by the tube 12 for the entry and exit of light and the mount for the fluorescent tube 34 which need to be bored in the blank, and also various small assembly bores. The manufacturing effort is thus correspondingly small and the optical elements can easily be positioned relative to one another in troublefree alignment without special adjustment work being required.

The extruded section of the housing insert 30 is basically L-shaped as seen in side elevation (FIG. 3). The fluorescent tube 34, or another light transmitter such as a double-ended tubular lamp, a laser etc. are located on one of the two limbs of the L, which are orthogonal to one another, and the photodetector 54 is disposed in the other L-shaped limb. The extruded section has cut-outs for at least a part of the optical components and the cut-outs accommodate the edges of the components and offer flat mounting surfaces on which the components can be positioned. In particular the mirrors 36 are built in this manner into the housing insert 30 below the light transmitter. The mirrors 36 are adhesively secured to the associated guide surfaces of the housing insert 30. The filter 38 and the semi-permeable mirror 40 are clampingly secured at the housing insert 30. The retaining elements are in each case two strings of round elastic cord which extend along oppositely disposed side edges of the optical components and sit together with these optical components in recesses of the housing insert 30. The recesses have machined regions which are matched to the round cord. During assembly the round cord 76 is drawn into the recess (and stretched), the optical component is inserted and the cord released whereupon its projecting ends can be cut away.

A mount is formed in the housing insert 30 for the aperture diaphragm 44 into which the aperture diaphragm 44 can be inserted in form-locked manner. It is secured in the mounted position by a locking bar 78 which is rotatably mounted on the housing insert 30 about the shaft of a screw 80 and which can be fixed by tightening the screw 80. Furthermore, a lens holder 82 is molded in one piece on the housing insert 30.

The inner side of the housing insert 30 opposite to the light transmitter on the far side of the semi-transparent mirror 40 has a rough surface structure. FIG. 3 shows in this respect a toothed arrangement 84 with toothed flanks which extend at right angles to one another. The toothed arrangement serves as a diffusor and absorber for the light component which after leaving the light transmitter is not reflected by the semi-permeable mirror 40 but instead passes through it and is thus lost for the purposes of measurement. The toothed arrangement 84 is molded in the extrusion technique with the housing insert 30 which can additionally be blackened in the toothed or otherwise roughened region.

The mount for the fluorescent tube 34 is a transverse bore 86 which passes through the extruded housing insert 30. As explained in more detail with reference to FIGS. 6 and 7 the fluorescent tube 34 is of rod-like shape. It emits light in its axially central region and is provided with electrical contacts at both ends. An insulating sleeve 88 is pushed into the inner portion of the transverse bore 86 and surrounds a contact spring 90 which is formed as a compression coil spring. One end of the spring is led out centrally through the base of the insulating sleeve 88 and is soldered to a braided lead 92. The soldered connection can be insulated by a shrinkable sleeve which is previously drawn onto the braided lead 92 and shrunk over the soldered connection. The outer end of the transverse bore 86 accommodates an insulating sleeve 96 in form-locked manner in which a contact sleeve 98 is in turn mounted. An electrical connection 100 is located at the rear side of the contact sleeve as shown in FIG. 4 and the insulating sleeve 96 is broken away in the region of the electrical connection 100. A braided lead 102 is spot-welded to the electrical connection 100, is led through the wall opening of the insulating sleeve and forms the second electrical contact for the fluorescent tube 34.

It can be seen from FIG. 5 that the mirror arrangement 36 consists of two mirrors arranged alongside one another beneath the fluorescent tube 34. Furthermore, control knobs 104 can be recognised on the electronic part 54 which is mounted on the housing insert 30 and directly associated with the photodiode 55. As already mentioned the housing insert 30 is a combined optical electronic carrier or support.

The precision of the contact and guide surfaces obtained in the extrusion process guarantees that the optical and optoelectronic components mounted on the insert 30 lie in an adjusted position relative to one another. This applies in particular also to the fluorescent tube 34 which is received relative thereto in a precision mount which will be described later. On assembly of the luminescence sensor it is only necessary to align the complete pre-assembled housing insert 30 relative to the optical part in the tube 12. As can be seen with reference to FIGS. 1 and 3 a three point threaded mounting with fitted dowels 32 is provided for this purpose. Three apertures 106, 108, 110 which extend in the longitudinal direction of the extruded part are constructed as blind slots with the slot opening being narrowed or necked relative to the inner parts of the apertures 106, 108, 110. Two of the apertures 106, 108 are located in the L-limb of the housing insert which carries the light transmitter and indeed on both sides of and above the associated mount. The enlarged inner region of the innermost aperture 106 is of circular cross-section and the outermost opening 108 is oval. The third opening 110 which is likewise of oval internal cross-section is arranged approximately centrally at the upper side of the housing insert 30. The aperture 106 of round cross-section forms an axis about which the whole insert 30 can be pivoted for which purpose the apertures 108, 110 with oval cross-section offer the requisite clearance. In this way one can adjust the housing insert 30 with the dowel pins 32 loosely screwed into place and can then tighten the dowel pins 32.

FIGS. 6 and 7 show the fluorescent tube 34 which serves as the light transmitter in a positioning mount. The positioning mount consists of two sleeves 112, 114 which are pushed onto the two ends of the fluorescent tube 34 and which fit precisely in the mount of the housing insert 30. The sleeves 112, 114 consist of metal. They are closed at their free axial ends in each case with a cover 116 which is likewise of metal. The cover has a central bore 118 of relatively large diameter. Electrical connection wires 122 of the fluorescent tube 34 are passed out through the opening 120 of the sleeves 112, 114 and are spot-welded at 124 to the cover 116.

When attaching the precision mount one displaces the fluorescent tube 34 axially into the sleeves 112, 114 until an optimum illumination is obtained. The sleeves 112, 114 are held during this securely at a well defined spacing. After achieving the ideal adjustment the sleeves 112, 114 are cast out with an adhesive through the central bore 118 of the cover 116 so that one obtains an assembly which can no longer be released without breaking it. The terminal wires 122 are then spot-welded in position. A cap 126 around which a compression spring 128 is arranged is adhesively secured to the right hand sleeve 114 in FIG. 6. The cap 126 and the compression coil spring 128 are likewise adhered to one another. The cap 126 has a radially projecting flange 130 against which the end of the compression coil spring 128 is braced. The flange 130 lies, when the cap 126 is mounted, against a radially projecting collar 132 of the sleeve 114. As can be seen from FIGS. 1 and 3 the mounted fluorescent tube 34 is clamped at its two axial ends between two compression coil springs 90, 128.

In the illustrated embodiment the mounting bores 108, 110, 112 for the housing insert 30 are completely premolded on the latter. An arrangement is however also possible in which the insert 30 is first bored in the adjusted position with recesses or grooves provided on the extruded section being able to serve as a basis for the arrangement of the bores.

We claim:

1. A luminescence sensor comprising a housing having sidewalls and an opening in one of said sidewalls; a front lens mounted at said opening; a reflective surface disposed outside of said housing and adapted to reflect a light beam emerging from the front lens back to the lens; disposed within said housing, a light transmitter for generating a first beam of light, first means for directing at least a portion of said first beam of light towards and through said front lens to produce an emergent beam of light for incidence at said reflective surface to form a modified beam at least part of which enters said housing through said front lens as a received beam, a light receiver, second means for directing said received beam to said light receiver, and electronic circuitry connected to said light receiver; a single carrier insert for supporting said light transmitter, said light receiver and said first and second means, said light transmitter, said first means, said light receiver and said second means being maintained in pre-adjusted positions relative to one another on said carrier insert by said carrier insert and defining with said carrier insert a first constructional group; said housing and said front lens defining a second constructional group; and means permitting relative adjustment movements between said first and second constructional groups and rigidly and non-displaceably securing said carrier insert to said housing.

2. A luminescence sensor in accordance with claim 1 wherein the carrier insert in that the housing insert is constructed as an extruded section.

3. A luminescence sensor in accordance with a claim 1 wherein at least one of the housing and the insert includes reference mounting points for positioning the insert.

4. A luminescence sensor comprising a housing having sidewalls and an opening in one of said sidewalls; a front lens mounted at said opening; a reflective surface disposed outside of said housing and adapted to reflect a light beam emerging from the front lens back to the lens; disposed within said housing a light transmitter for generating a first beam of light, first means for directing at least a portion of said first beam of light towards and through said front lens to produce an emergent beam of light for incidence at said reflective surface to form a modified beam at least part of which enters said housing through said front lens as a received beam, a light receiver, second means for directing said received beam to said light receiver and, electronic circuitry connected to said light receiver; a single carrier insert for supporting said light transmitter, said light receiver and said first and second means; said carrier insert comprising a section of a continuous extrusion defined by first and second, generally L-shaped rails disposed parallel to one another and first and second transverse webs disposed between said rails and holding the same in space apart relationship, thereby defining an extrusion which is substantially L-shaped; said light transmitter, said first means, said light receiver and said second means being maintained in pre-adjusted positions relative to one another on said carrier insert by said carrier insert and forming with said carrier insert a first constructional group; wherein said housing and said front lens forming a second constructional group; and means permitting relative adjustment movement between said first and second constructional groups and rigidly and non-displaceably securing said carrier insert to said housing.

5. A luminescence sensor in accordane with claim 4, wherein said light transmitting, said first and second means and said light receiver all lie substantially in a common plane representing a cross-section through said extrusion; wherein said extrusion includes first, second, and third channels extending through said first and second rails perpendicular to said common plane; and including first, second and third fastening means extending through said first, second and third channels respectively for securing said extrusion within said housing; said first channel being of substantially round cross-section; a dowel pin extending through said first channel and forming said first fastening means; and wherein said second and third channels are of elongated cross-section to permit restricted pivoting of said section of said L-shaped extrusion in said common plane about said dowel pin.

6. A luminescence sensor in accordance with claim 4, wherein said section of said L-shaped extrusion has a first limb and a second limb substantially at right angles thereto; wherein said first and second limbs meet, at a transition region and each have a respective free end remote from said transition region; wherein said light transmitter is disposed at said free end of said first limb and said light receiver at said free end of said second limb; wherein said first means comprises a semi-transparent mirror disposed in an inclined position relative to said first limb across said transition region for deflecting light from said light transmitter through said front lens; and wherein said second means comprises lens means positioned in said second limb between said light receiver and said semi-transparent mirror.

7. A luminescence sensor in accordance with claim 6, wherein a transverse bore is formed through said first limb substantially parallel to said second limb for receiving said light transmitter.

8. A luminescence sensor in accordance with claim 6, wherein said light transmitter comprises a fluorescent tube.

9. A luminescence sensor in accordance with claim 6, including a precision mount insertable into said transverse bore, and wherein said light transmitter is disposed within the precision mount.

10. A luminescence sensor in accordance with claim 6, including a reflector positioned within said housing on the opposite side of said light transmitter from said semi-transparent mirror.

11. A luminescence sensor in acordance with claim 7, wherein a bore is provided in said housing in alignment with said transverse bore for exchanging said light transmitter; and including a plug for closing said bore in said housing.

12. A luminescence sensor in accordance with claim 6, wherein said first and second webs are disposed across said second limb and wherein an opening is formed in said first web for receiving said lens means.

13. A lumiscenece sensor in accordance with claim 6, wherein said semi-transparent mirror has first and second side edges, and wherein respective first and second grooves are provided in said first and second rails for receiving said first and second side edges respectively.

14. A luminescence sensor in accordance with claim 13, including resilient cords in said grooves for securing said side edges of said semi-transparent mirror in position therein.

* * * * *